United States Patent Office 3,016,395
Patented Jan. 9, 1962

3,016,395
METHYL-2-KETO-D-GLUCONATE
Oscar L. Norman, Northbrook, Ill., assignor to International Minerals & Chemical Corporation, a corporation of New York
No Drawing. Filed Mar. 4, 1960, Ser. No. 12,670
11 Claims. (Cl. 260—483)

The present invention relates to esters of 2-keto-D-gluconic acid. More particularly, it relates to a method for preparing methyyl 2-keto-D-gluconate directly from calcium 2-keto-D-gluconate.

2-keto-D-gluconic acid is an important intermediate in a well-known process for the synthesis of isoascorbic acid, which commonly involves fermentation of a glucose-containing medium with Pseudomonas fluorescens, precipitation of the resulting 2-keto-D-gluconic acid in the form of its calcium salt, acidification of the calcium salt to liberate the free 2-keto-D-gluconic acid, esterification of the latter with methanol, conversion of the ester into sodium isoascorbate by treatment with sodium methoxide, and finally acidification to release the free isoascorbic acid. In this process, the conversion of calcium 2-keto-D-gluconate via the free acid into the methyl ester has proved to be a troublesome problem. In the usual method, the calcium 2-keto-D-gluconate salt is admixed with water and acidified with sulfuric acid, the resulting precipitate of calcium sulfate is removed by filtration, and the filtrate (containing dissolved 2-keto-D-gluconic acid) is concentrated and refluxed with methanol. The filtration, however, is difficult, the quantity of methanol required is excessively large, and the conversion is low. It appears, therefore, that no satisfactory method for converting calcium 2-keto-D-gluconate to the methyl ester has heretofore been available.

An object of the present invention is to prepare methyl 2-keto-D-gluconate.

Another object is to convert calcium 2-keto-D-gluconate directly into methyl 2-keto-D-gluconate.

Another object is to improve the yield of methyl 2-keto-D-gluconate obtainable from calcium 2-keto-D-gluconate.

Other objects of the invention will be apparent from the following description and claims.

In accordance with one embodiment of the present invention, calcium 2-keto-D-gluconate, methanol, and hydrogen chloride are commingled and allowed to react. The reaction appears to proceed in stages. In the first stage, the calcium 2-keto-D-gluconate appears to be converted into calcium chloride and 2-keto-D-gluconic acid. Both of these materials are readily soluble in the methanol, with the result that an essentially clear solution is ordinarily obtained. Soon thereafter, methyl 2-keto-D-gluconate begins to form. This material is insoluble in the reaction medium, and crystallizes therefrom more or less rapidly, depending upon the temperature existing therein. The formation and crystallization of the ester appear to be considerably slower than the first step of the reaction, so that the crystallization ordinarily requires a number of hours for completion. The resulting ester is filtered off, washed, and dried, and is obtained thereby in the form of white, nearly pure crystals. The ester can be recrystallized if desired by dissolving in methanol at a temperature preferably near the reflux point, decolorizing with activated charcoal, and then cooling and crystallizing.

In a more specific embodiment of the invention, calcium 2-keto-D-gluconate is slurried in an excess of methanol (suitably around 2:1 weight ratio of methanol to the calcium salt), and anhydrous hydrogen chloride is bubbled into the resulting slurry until approximately two moles of HCl have been absorbed per mole of calcium salt. By the time the addition of hydrogen chloride has been completed, the calcium 2-keto-D-gluconate becomes fully dissolved. Stirring of the solution is continued, and the solution is cooled and allowed to stand over night, during which time methyl 2-keto-D-gluconate forms and precipitates. The solids are removed by filtration, washed with a small proportion of methanol, and dried in air. The product ordinarily melts at 170–172° C. (literature value 174–176° C.), and is obtained in a yield around 70% of theory, based upon the original calcium 2-keto-D-gluconate.

In another specific embodiment of the invention, anhydrous hydrogen chloride is bubbled into methanol until the desired quantity is dissolved therein. Calcium 2-keto-D-gluconate is then added slowly thereto with stirring, and the reaction and crystallization are carried out as before.

Instead of hydrogen chloride, various other halogen compounds can be employed satisfactorily in the process of the present invention, all of these compounds being apparently substances which afford hydrogen halide under the reaction conditions employed. Among them are hydrogen bromide, thionyl chloride, thionyl bromide, sulfuryl chloride, sulfuryl bromide, phosphorus oxychloride, phosphorus oxybromide, phosphorus trichloride, phosphorus tribromide, phosphorus pentachloride, phosphorus pentabromide, chlorine, and bromine. Each type of compound has its own advantage in the invention, as will be discussed later herein.

In carrying out the reaction, it is important to employ a sufficient quantity of methanol to react with the calcium 2-keto-D-gluconate and to form a mobile medium to facilitate contact between the reactants. For this purpose, it is ordinarily sufficient to employ methanol in a weight ratio to the calcium 2-keto-D-gluconate of about 1.5:1 or higher, preferably around 2:1. The methanol that does not undergo reaction is readily recovered and recycled. It will also be apparent that the methanol must be present in a sufficient quantity to dissolve the calcium chloride and the 2-keto-D-gluconic acid presumed to be formed in the first step of the reaction, and to maintain the calcium chloride in solution, since otherwise the latter would tend to contaminate the methyl 2-keto-D-gluconate subsequently produced and crystallized.

The proportion of halogen compound employed should be such as to afford hydrogen halide in at least twice the molar quantity of calcium 2-keto-D-gluconate employed in the reaction in order to ensure complete liberation of the 2-keto-D-gluconic acid and to ensure that the calcium values remain in a dissolved condition, so that the methyl 2-keto-D-gluconate can be isolated therefrom.

The reaction temperature can vary over a wide range without greatly altering the conversion or yield, and without creating major problems of processing. The reaction is conveniently carried out at any temperature between the reflux point of the reaction mixture under the existing pressure conditions downward to 0° C. or lower, so long as the reaction medium remains fluid.

As soon as the esterification reaction begins, it is common to find that the methyl 2-keto-D-gluconate precipitates rapidly. The rate of precipitation ordinarily slows down with time, however, and it is generally desirable to allow the crystallization to continue for at least about 3 hours and preferably about 8 to about 20 hours in order for the reaction to reach equilibrium. The crystals are then ordinarily filtered off, and a second crop of crystals can be obtained by allowing the reaction mixture to stand for an additional period of time. For the crystallization step, it is desirable to hold the temperature below 40° C. For this reason, it is preferred to carry out the primary reaction at ordinary temperatures around 20° C., then to allow the reaction mixture to stand at the same or slightly lower temperature with gentle agitation to assist in the crystallization.

The product in the crystalline form recovered from the first crystallization does not ordinarily represent 100% of the amount formed in the reaction. It has been found that the yield can be improved by treating the mother liquor from the ester crystallization with sulfuric acid to precipitate calcium in the form of calcium sulfate, filtering off the latter, and crystallizing a further quantity of the methyl 2-keto-D-gluconate, or by allowing the mother liquor to stand for an additional period of time, during which a second crop of crystals forms.

Various halogens and halogen compounds heretofore disclosed can be employed in the process of the present invention; however, for reasons both economical and technical, it is generally preferred that chlorine or the chlorine-containing compounds be used, rather than the analogous bromine-containing substances. For example, when a choice between anhydrous hydrogen chloride and hydrogen bromide is presented, hydrogen chloride would ordinarily be selected because it is cheaper and easier to handle. Although the sulfuryl halides and phosphorus halides and oxyhalides yield fully satisfactory results, it is ordinarily not only more convenient but more economical to employ either a hydrogen halide or a thionyl halide.

The presence of water in the reaction system in any considerable proportion tends to slow the desired reaction as well as the crystallization of the methyl 2-keto-D-gluconate. For this reason, it is preferred that the proportion of water be held as low as possible, and should in any event be held to less than about 30% preferably less than about 20%, by weight of the complete system, dry basis. To this end, it is desirable to use all of the reactants in essentially anhydrous form, although they may contain water with the aggregate limitations noted above. Thus, hydrogen chloride can be used in the form of the anhydrous gas, a condensed liquid, or an aqueous solution, the latter being commonly referred to as "hydrochloric acid."

The following operating examples will more clearly illustrate the invention:

*Example I*

Calcium 2-keto-D-gluconate of about 95% purity as the trihydrate (500 grams) was placed in a 3-liter glass flask equipped with a stirrer, a thermometer, and a gas inlet tube. To the flask was also added commercial grade anhydrous methanol (2 liters) with stirring, and the flask was immersed in an ice bath for cooling. Stirring was continued, and anhydrous hydrogen chloride gas (86 grams) was bubbled into the slurry while the latter was maintained at a temperature of around 20 to 25° C. By the time the addition of hydrogen chloride was completed, essentially all of the calcium salt had gone into solution, and methyl 2-keto-D-gluconate began to crystallize. Stirring and crystallization were continued overnight at room temperature. The slurry was then filtered and the solids were washed with methanol (200 milliliters) and dried. The product melted at 168–172° C. (literature value, 174–176° C.) and weighed 314 grams, corresponding to a yield of 76.1% based on calcium 2-keto-D-gluconate.

*Example II*

Into a one liter round-bottomed flask equipped with a gas inlet tube, a water-cooled reflux condenser, a stirrer, and a thermometer were added 100 grams of calcium 2-keto-D-gluconate trihydrate, and 200 milliliters of methanol with stirring. The flask was cooled in an ice-water bath, and 60 grams of hydrogen bromide gas were bubbled into the slurry over a 40-minute period, the temperature being held within the range of 20–25° C. The solids completely dissolved during addition of the hydrogen bromide. After the addition of hydrogen bromide had been completed, stirring was continued, and after 10 minutes a precipitate of methyl 2-keto-D-gluconate began to appear. After 3 hours, the solid ester was filtered from the reaction product and washed with three 50-ml. portions of methanol. The yield of first-crop crystals was 54.3 grams (63.5% of theory), melting at 168–170° C.

*Example III*

Anhydrous hydrogen chloride was bubbled into 200 milliliters of methanol in a 500 milliliter flask until 18 grams had dissolved. Calcium 2-keto-D-gluconate trihydrate (100 grams, of 97% purity) was then added slowly to the solution with stirring, the flask being cooled in an ice bath to maintain the temperature at about 20° C. The calcium 2-keto-D-gluconate went completely into solution.

Stirring and cooling of the mixture were continued overnight at about 20° C., during which time methyl 2-keto-D-gluconate crystallized. The resulting crystals were separated by filtration, washed with methanol (50 milliliters) to remove impurities, and dried in air at room temperature. The resulting ester melted at 170–172° C. and weighed 58 grams, corresponding to a yield of 70% of theory, based upon the original calcium 2-keto-D-gluconate.

The product was purified by recrystallization from methanol. For this purpose, the impure ester was dissolved completely in recycled methanol (methanol which had been used to recrystallize previous batches of the ester) at the reflux point, the ester-to-methanol weight ratio being about 1:15. The solution was treated with about 0.06 weight-percent of activated carbon and filtered hot, then cooled to 5° C. At this temperature the ester crystallized out and was filtered off and dried in air. An 85% recovery of the ester was obtained, and the precipitated material melted at 174–176° C., the value reported in the literature for methyl 2-keto-D-gluconate.

*Example IV*

Calcium 2-keto-D-gluconate trihydrate (100 grams) was suspended in 200 ml. of methanol. After thorough mixing, the suspension was cooled to between 0 and 5° C.

To the suspension, 17 ml. of thionyl chloride were added dropwise with stirring. The calcium salt gradually dissolved. The resulting solution was permitted to stand at a temperature between 0 and 5° C. for a period of about 60 hours, during which time a crystalline solid gradually formed.

The solid was filtered off, washed with methanol, and dried. This material was identified as methyl 2-keto-D-gluconate having a melting point between 164 and 168° C. The yield was 48.94 grams (55.5% of theory).

The mother liquor was allowed to stand at 0–5° C. for 60 additional hours, during which time a second crop of crystals formed. These crystals were filtered off, washed with methanol, and dried, yielding 9.13 grams of methyl 2-keto-D-gluconate.

The combined crystal crops weighed 58.07 grams, equivalent to a yield of 68% of theory.

*Example V*

To a one-liter, three-necked flask equipped with a stirrer, a thermometer, and a dropping funnel and immersed in an ice-water bath were added 100 grams of calcium 2-keto-D-gluconate trihydrate and 200 ml. of methanol. The thick slurry was cooled to 15° C. and phosphorus oxychloride added dropwise with stirring and cooling until 25 grams (theory, 24 grams) had been added. After all the reagent had been added, the materials were left in the cooling bath and stirring was continued while the contents of the flask gradually warmed to room temperature. The solution became clear about 2 hours after the last portion of POCl$_3$ had been added. After an additional hour, a precipitate began to form. Stirring was continued and the solution left to stand overnight. The solids were then filtered from the solution using a Buechner funnel and were washed once with 50 ml. of methanol. The yield was 64.1 grams or 73% of theory, based upon the original calcium 2-keto-D-gluconate, and the product melted at 169–172° C.

*Example VI*

To a one-liter, three-necked flask equipped with a mechanical stirrer, a thermometer, and a dropping funnel were added 100 grams of calcium 2-keto-D-gluconate trihydrate and 200 ml. of methanol. Sulfuryl chloride was added dropwise over a 40-minute period with cooling and stirring until 20 ml. had been added. The temperature during the reaction was maintained at 15±5° C. The ice-water bath was left in place and stirring continued. Turbidity was at a minimum about 3 hours after the addition of the last portion of sulfuryl chloride. The mixture was left to stand overnight at room temperature during which time crystals of the methyl ester were formed. The mixture was then cooled to 10° C. and filtered. The solids were washed with one 50-ml. portion of methanol and allowed to air-dry. The yield was 66.0 grams (75% of theory) of a product melting at 158–159° C.

*Example VII*

To a one-liter, three-necked flask equipped with a gas inlet tube, a thermometer, a mechanical stirrer, and a gas outlet tube were added 100 grams of calcium 2-keto-D-gluconate trihydrate and 200 ml. of methanol. The mixture was stirred and 17 grams of chlorine gas were added over a 45-minute period with the flask in an ice-water bath to maintain the temperature at 20–25° C. Stirring was continued, and after another 45 minutes all the solids had gone into solution. The methyl ester began to precipitate after 3 hours and was filtered from the solution after an additional hour. The solids were washed with a 50-ml. portion of methanol. The yield of first crop crystals was 49.5 grams (56.3% of theory), and the melting point was 166–170° C. The filtrate was stored in a refrigerator overnight and filtered. Yield of second crop crystals, 6.3 grams (7.1% of theory), and the melting point was 167–171° C. Total yield was therefore 63.4% of theory.

*Example VIII*

Forty milliliters of concentrated hydrochloric acid, commercial grade, were mixed with 200 ml. of methanol and the mixture was cooled to 0–5° C. To the chilled solution 100 grams of calcium 2-keto-D-gluconate trihydrate were added slowly with stirring. After the solids dissolved, the reaction mixture was allowed to stand at a temperature around 0–5° C. for about five days. Crystals weighing 46.5 grams were separated from the mother liquor, representing about 54% of theory, based on the calcium 2-keto-D-gluconate trihydrate.

The filtrate was allowed to stand for about 60 additional hours, whereby 5.21 grams of the methyl ester crystallized. The total amount of methyl ester was 57.8% of theory.

*Example IX*

Calcium 2-keto-D-gluconate (100 grams) and 200 ml. of methanol are slurried in a flask and cooled to around 20° C. To the slurry are added 39 grams of bromine gas with continued stirring and cooling. The solids go into solution, and methyl 2-keto-D-gluconate then crystallizes out. The ester is filtered off, washed with methanol, and dried. The product weighs about 50 grams, corresponding to a yield of about 57% of theory.

*Example X*

Calcium 2-keto-D-gluconate (100 grams) and 200 ml. of methanol are slurried in a flask and cooled to around 20° C. To the slurry are added 96 grams of phosphorus pentachloride with continued stirring and cooling. The solids go into solution, and methyl 2-keto-D-gluconate then crystallizes out. The ester is filtered off, washed with methanol, and dried. The product weighs about 50 grams, corresponding to a yield of about 57% of theory.

While the invention has been described by reference to certain specific embodiments thereof, it is to be understood that such matters are purely illustrative, for the purpose of clarifying the invention, and the invention is in no sense to be considered limited thereto. Numerous modifications and equivalents of the present invention will be apparent from the foregoing description to those skilled in the art.

The present application is a continuation-in-part of copending application U.S. Serial No. 744,669, filed June 26, 1958, and now abandoned.

In accordance with the foregoing description, the following claims distinctly claim the subject matter of the invention.

What is claimed is:

1. A method for preparing methyl-2-keto-D-gluconate which comprises commingling calcium-2-keto-D-gluconate with methanol and a substance selected from the group consisting of hydrogen chloride, hydrogen bromide, thionyl chloride, thionyl bromide, sulfuryl chloride, sulfuryl bromide, phosphorus oxychloride, phosphorus oxybromide, phosphorus trichloride, phosphorus tribromide, phosphorus pentachloride, phosphorus pentabromide, chlorine and bromine, the proportion of methanol being sufficient to react with the calcium-2-keto-D-gluconate and to initially produce a mobile slurry, and the molar proportion of said substance to calcium-2-keto-D-gluconate being at least about 2:1, whereby the solid phase dissolves in the methanol and methyl-2-keto-D-gluconate crystallizes therefrom.

2. A process as in claim 1 wherein said substance affording a hydrogen halide is thionyl chloride.

3. A process as in claim 1 wherein said substance affording a hydrogen halide is sulfuryl chloride.

4. A process as in claim 1 wherein said substance affording a hydrogen halide is chlorine.

5. A process as in claim 1 wherein said substance affording a hydrogen halide is bromine.

6. A method for preparing methyl 2-keto-D-gluconate which comprises commingling calcium 2-keto-D-gluconate with methanol and hydrogen chloride, the weight ratio of methanol to calcium 2-keto-D-gluconate being at least about 1.5:1, and the molar proportion of hydrogen chloride to calcium 2-keto-D-gluconate being at least about 2:1, the resulting mixture containing less than about 30% water by weight, allowing the mixture to react at a temperature between about 0° C. and the reflux temperature whereby the solid phase dissolves in the methanol and methyl 2-keto-D-gluconate crystallizes therefrom, and recovering the methyl 2-keto-D-gluconate from the reaction product mixture.

7. A method for preparing methyl 2-keto-D-gluconate which comprises commingling calcium 2-keto-D-gluconate with methanol and hydrogen bromide, the weight ratio of methanol to calcium 2-keto-D-gluconate being at least about 1.5:1, and the molar proportion of hydrogen bromide to calcium 2-keto-D-gluconate being at least about 2:1, the resulting mixture containing less than about 30% water by weight, allowing the mixture to react at a temperature between about 0° C. and the reflux temperature, whereby the solid phase dissolves in the methanol and methyl 2-keto-D-gluconate crystallizes therefrom, and recovering the methyl 2-keto-D-gluconate from the reaction product mixture.

8. A method for preparing methyl 2-keto-D-gluconate which comprises slurrying calcium 2-keto-D-gluconate in an excess of methanol, adding hydrogen chloride thereto in a molar ratio to calcium 2-keto-D-gluconate above about 2:1, whereby the calcium 2-keto-D-gluconate undergoes dissolution therein, crystallizing methyl 2-keto-D-gluconate therefrom at a temperature below about 40° C., and recovering the methyl 2-keto-D-gluconate from the reaction product mixture.

9. A method for preparing methyl 2-keto-D-gluconate which comprises slurrying calcium 2-keto-D-gluconate with methanol in a weight ratio of methanol to calcium 2-keto-D-gluconate of at least about 1.5:1, adding anhydrous hydrogen chloride thereto at a temperature around 20° C. to a molar ratio of HCl to calcium 2-keto-D-gluconate of at least about 2:1, whereby the calcium 2-keto-D-gluconate goes substantially completely into solution, maintaining the resulting solution at a temperature below about 20° C. with agitation while methyl 2-keto-D-gluconate crystallizes therefrom, and recovering the methyl 2-keto-D-gluconate from the reaction product mixture.

10. A process as in claim 9 wherein the methyl 2-keto-D-gluconate mother liquor is treated to precipitate calcium therefrom and a further quantity of methyl 2-keto-D-gluconate is crystallized from the treated mother liquor.

11. A method for preparing methyl 2-keto-D-gluconate which comprises slurrying calcium 2-keto-D-gluconate with methanol in a weight ratio of methanol to calcium 2-keto-D-gluconate of at least about 1.5:1, adding concentrated hydrochloric acid thereto at a temperature around 20° C. to a molar ratio of HCl to calcium 2-keto-D-gluconate of at least about 2:1, whereby the calcium 2-keto-D-gluconate goes substantially completely into solution, maintaining the resulting solution at a temperature below about 20° C. with agitation while methyl 2-keto-D-gluconate crystallizes therefrom, and recovering the methyl 2-keto-D-gluconate from the reaction product mixture.

No references cited.